(12) United States Patent
Li et al.

(10) Patent No.: US 12,206,738 B2
(45) Date of Patent: Jan. 21, 2025

(54) CENTRALIZED AND AGENTLESS IN-CLOUD MANAGEMENT OF ON-PREMISES RESOURCES

(71) Applicant: Dell Products L.P., Round Rock, TX (US)

(72) Inventors: Wenfeng Li, Shanghai (CN); Michael G. Varteresian, Lexington, MA (US); Muzhar S. Khokhar, Shrewsbury, MA (US); Haijun Zhong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/585,314

(22) Filed: Jan. 26, 2022

(65) Prior Publication Data
US 2023/0239360 A1    Jul. 27, 2023

(51) Int. Cl.
  *G06F 15/173*    (2006.01)
  *H04L 41/0813*   (2022.01)
  *H04L 67/10*     (2022.01)
  *H04L 67/141*    (2022.01)

(52) U.S. Cl.
  CPC ........ *H04L 67/141* (2013.01); *H04L 41/0813* (2013.01); *H04L 67/10* (2013.01)

(58) Field of Classification Search
  CPC .... H04L 67/10; H04L 67/141; H04L 41/0813
  See application file for complete search history.

(56) References Cited

U.S. PATENT DOCUMENTS

| | | | | |
|---|---|---|---|---|
| 11,038,752 | B1* | 6/2021 | Ranjan | H04L 12/4625 |
| 2006/0075128 | A1* | 4/2006 | Kotler | H04L 63/102 |
| | | | | 709/229 |
| 2008/0201465 | A1* | 8/2008 | Jones | H04L 43/00 |
| | | | | 709/224 |
| 2015/0222604 | A1* | 8/2015 | Ylonen | H04L 9/3263 |
| | | | | 713/171 |
| 2016/0378604 | A1* | 12/2016 | Teshome | G06F 11/2284 |
| | | | | 714/36 |
| 2022/0286358 | A1* | 9/2022 | Kmak | H04L 67/34 |

FOREIGN PATENT DOCUMENTS

| | | | | |
|---|---|---|---|---|
| EP | 3024175 A1 * | 5/2016 | | G06F 8/65 |
| WO | WO-2018144060 A1 * | 8/2018 | | G06F 9/5061 |

* cited by examiner

*Primary Examiner* — Yves Dalencourt
(74) *Attorney, Agent, or Firm* — Jackson Walker L.L.P.

(57) ABSTRACT

Disclosed methods and systems for managing on-premises information handling resources establish, by an in-cloud web portal, an agentless connection to an on-premises information handling resource and perform, via the agentless connection, a configuration management operation to modify a configuration of the on-premises handling resource. Establishing the agentless connection and performing the configuration management operation may include one or more appropriate API calls. Disclosed teachings enable a web-accessible, public cloud portal to perform active configuration management of on-premises resources scattered across any number of distinct and potentially isolated customer sites without deploying and maintaining management agent software within the customer's private cloud. The on-premises resources may include a multi-node cluster provided by a node or nodes of one or more HCI appliances.

9 Claims, 2 Drawing Sheets

CENTRALIZED AND AGENTLESS IN-CLOUD MANAGEMENT OF ON-PREMISES RESOURCES

TECHNICAL FIELD

The present disclosure relates to information handling system management and, more particularly, in-cloud management of private cloud resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are specifically designed to support hyper-converged infrastructure (HCI) deployments featuring centrally managed, tightly integrated compute, storage, and networking resources. Commercially distributed examples of HCI products include the VxRail family of HCI appliances from Dell Technologies. IT administrators may deploy multi-node clusters in their branch offices, manufacturing facilities, or other edge locations. Large enterprises may have hundreds or even thousands of such clusters.

Managing a large number of complex, on-premises resources distributed among a potentially large number of physical sites is challenging. Deployed clusters are typically able to communicate with a central data center but not with each other. While applications capable of monitoring multiple systems are available, few if any include active management capability, i.e., the ability to make configuration changes.

SUMMARY

In accordance with teachings disclosed herein, common problems associated with managing on-premises resources including, but not strictly limited to HCI clusters distributed among a potentially large number of physical sites, are addressed by disclosed methods and systems for managing on-premises information handling resources includes establishing, by an in-cloud web portal, an agentless connection to an on-premises information handling resource and performing, via the agentless connection, a configuration management operation to modify a configuration of the on-premises information handling resource. In at least some embodiments, establishing the agentless connection and performing the configuration management operation are achieved via API calls. While the costs and benefits associated with agentless vs. "agentful" deployments have been thoroughly vetted in the context of resource monitoring, disclosed teachings beneficially extend agentless approaches to active management use cases.

Methods disclosed herein further include establishing a second agentless connection to a second on-premises information handling resource located at a second on-premises location of the customer and performing, via this second agentless connection, a second configuration management operation to modify a configuration of the second on-premises information handling resource. In this manner, disclosed methods enable a web accessible public cloud portal to perform active configuration management of on-premises resources scattered across any number of distinct and potentially isolated customer sites.

In at least one embodiment, the on-premises information handling system resource is or includes a multi-node cluster and wherein one or more nodes of the cluster may be provided by a corresponding node or nodes of a VxRail appliance or another suitable HCI appliance.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figures 1, 2:
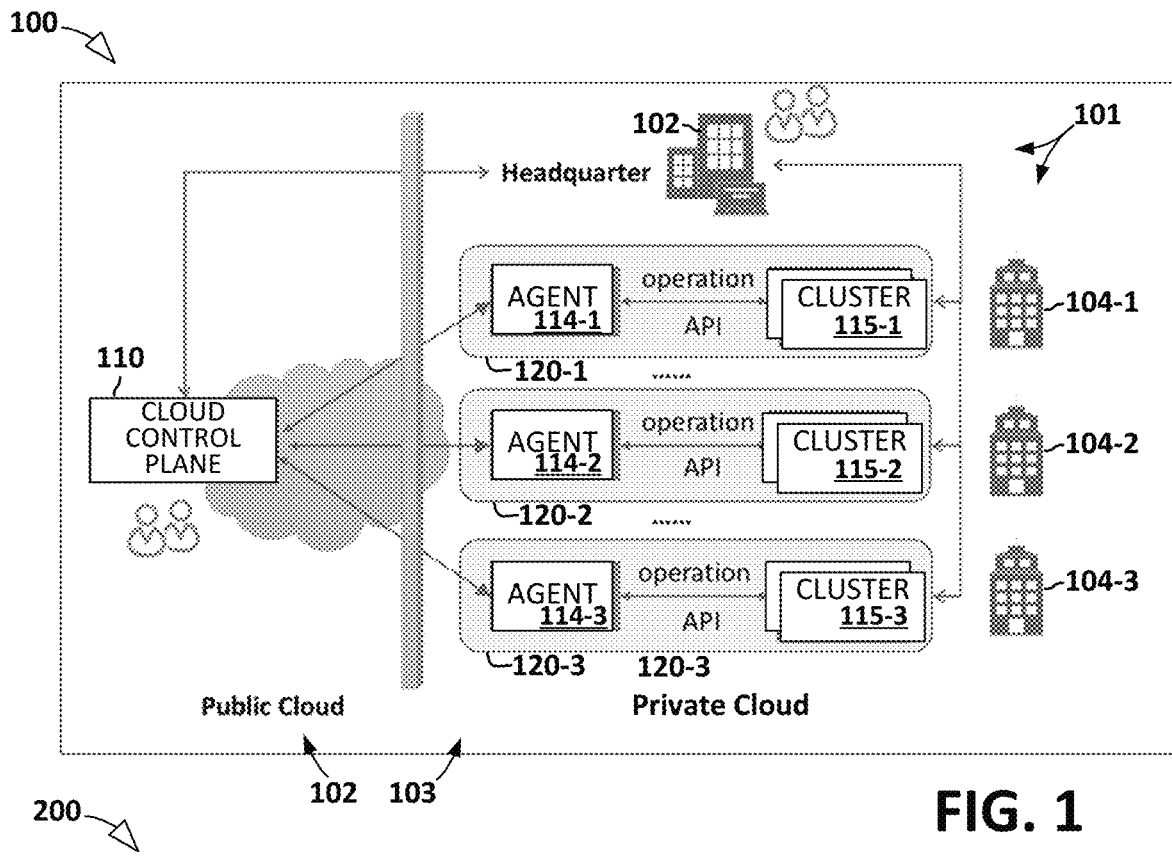
FIG. 1 illustrates an agent-based approach to managing on-premises resources.
FIG. 2 illustrates an agentless approach, in accordance with disclosed teachings, for managing on-premises resources distributed among a plurality of sites.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring to the drawings, FIG. 1 illustrates a cloud platform 100 for an entity referred to herein as customer 101, which is represented in FIG. 1 by a headquarters 102 and one or more edge computing locations 104, three of which are shown in FIG. 1. Cloud platform 100 includes a public cloud 102 and a private cloud 103. The public cloud 102 depicted in FIG. 1 includes a cloud control plane 110 for managing private cloud resources. The private cloud 103 depicted in FIG. 1 encompasses a number of smaller private clouds, each of which includes on-premises resources 120, exemplified in FIG. 1 by one or more managed clusters 115, at each edge location 104.

The cloud platform 100 in FIG. 1 employs a management agent 114 installed within the on-premises resources 120 of each edge location 104 and connected between cloud platform 110 and the corresponding managed cluster 115. Management agents 114 communicate with cloud control plane 110 and broker management commands on behalf of cloud platform 110.

While the illustrated cloud platform 100 may support centralized management of on-premises resources from cloud control plane 110, the cost of deploying and maintaining a fleet of middle layer agents, such as the management agents 114 depicted in FIG. 1, is non-trivial at best.

In accordance with disclosed teachings, FIG. 2 illustrates a cloud platform 200, including a public cloud 202 and a private cloud 203, for customer 101. The public cloud 202 depicted in FIG. 2 features a cloud control plane 210 providing centralized, cloud-based, and agentless management of the customer's private cloud resources. In at least some embodiments, cloud control plane 210 is implemented as an in-cloud web portal.

Like the private cloud 103 of FIG. 1, the private cloud 203 depicted in FIG. 2 encompasses smaller private clouds, each of which includes on-premises resources 220, exemplified in FIG. 2 by one or more managed clusters 215, at each edge location 104 of customer 101. However, unlike the cloud platform 100 of FIG. 1, the cloud platform 200 depicted in FIG. 2 requires no installed management agents and, instead, creates agentless connections 212 between cloud control plane 210 and managed on-premises resources such as the managed cluster 215, enabling cloud control plane 220 to make configuration changes and otherwise actively manage the customer's private cloud resources.

FIG. 2 illustrates cloud control plane 210 establishing agentless connections 212 with each managed cluster 215. In at least one embodiment, cloud control plane 210 establishes each agent connections 212 using one or more API calls in accordance with an appropriate API. As suggested by the name, each agentless connection 212 is characterized by the absence of a management agent intermediate between cloud control plane 210 and the customer's private-side managed clusters 215. Management commands, including configuration commands, may be executed via a web application, running in the customer's browser, that communicates with managed clusters 215 over the customer's network via a local or virtual private network (VPN) tunnel. A combination of physical and logical security ensures secure communications. In this manner, cloud platform 200 beneficially eliminates the need to deploy and manage the middle layer management agents 114 of cloud platform 100.

Referring now to FIG. 2, a method 200 for managing private cloud resources is illustrated in flow diagram format. The method 200 illustrated in FIG. 2 may, in at least some embodiments, be performed by the cloud control plane 210. The illustrated method establishes (block 202) an agentless connection to an on-premises information handling resource, such as a managed cluster 215, and performs (block 204), via the agentless connection, a configuration management operation to modify a configuration of the applicable on-premises resource. Establishing the agentless connection and performing the management operation may, as previously indicated, may be achieved via one or more appropriate API calls.

Figure 3:
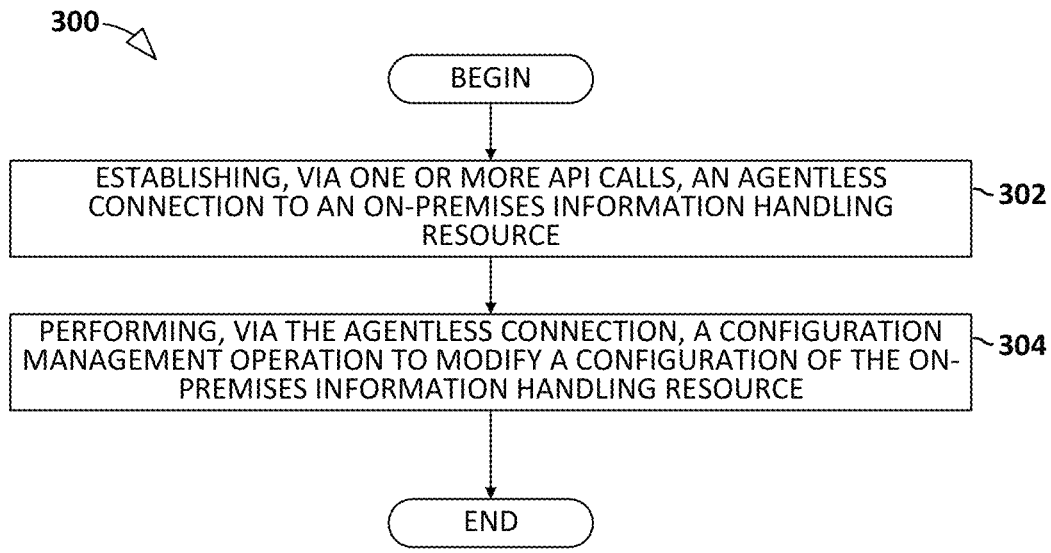
FIG. 3 illustrates a flow diagram of a method for managing on-premises resources from a central in-cloud portal.
Figure 4:
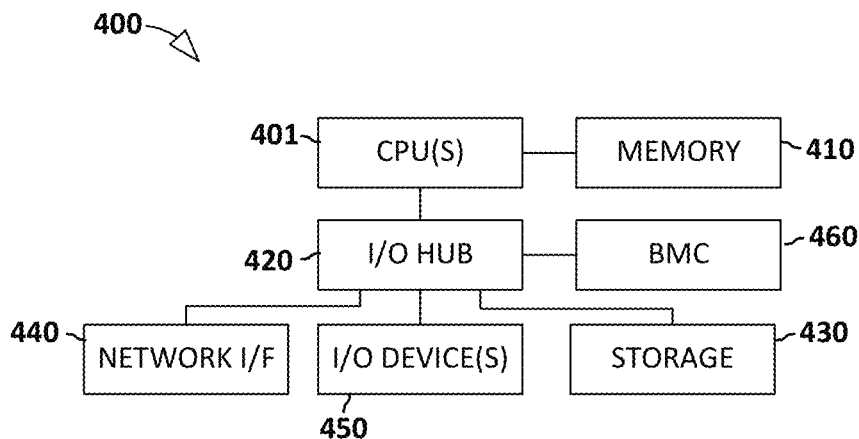
FIG. 4 illustrates an example information handling system suitable for use in conjunction with at some elements of the systems and methods disclosed in FIG. 1 through FIG. 3.

Referring now to FIG. 4, any one or more of the elements illustrated in FIG. 2 and FIG. 3 may be implemented as or by an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system management method, wherein the method comprises:
  establishing, by an in-cloud web portal including a customer browser, an agentless connection to an on-premises hyper-converged infrastructure (HCI) appliance wherein the agentless connection lacks a management agent intermediate between the in-cloud web portal and the on premises HCI appliance; and
  performing, via the agentless connection and a web application running in the customer, that communicates with managed clusters of the HCI appliance via a local or virtual private network (VPN) tunnel, a configuration management operation to modify a configuration of the HCI appliance, wherein the HCI appliance provides integrated and centrally management compute, storage, and network resources for a cluster of two or more nodes.

2. The method of claim 1, wherein establishing the agentless connection and performing the configuration management operation include performing one or more API calls to establish the agentless connection and perform the configuration management operation.

3. The method of claim 2, further comprising:
  establishing, by the in-cloud web portal, a second agentless connection to a second on-premises HCI appliance located at a different on-premises location; and
  performing, via the second agentless connection, a second configuration management operation to modify a configuration of the second on-premises HCI appliance.

4. An information handling system comprising:
  a central processing unit (CPU); and
  a computer readable memory, accessible to the processor, including process executable instructions that, when executed by the processor, cause the processor to perform operations, wherein the operations include:
  establishing, by an in-cloud web portal including a customer browser, an agentless connection to an on-premises hyper-converged infrastructure (HCI) appliance wherein the agentless connection lacks a management agent intermediate between the in-cloud web portal and the on premises HCI appliance; and
  performing, via the agentless connection and a web application running in the customer, that communicates with managed clusters of the HCI appliance via a local or virtual private network (VPN) tunnel, a configuration management operation to modify a configuration of the HCI appliance, wherein the HCI appliance provides integrated and centrally management compute, storage, and network resources for a cluster of two or more nodes.

5. The information handing system of claim 4, wherein establishing the agentless connection and performing the configuration management operation include performing one or more API calls to establish the agentless connection and perform the configuration management operation.

6. The information handling system of claim 5, wherein the operations further include:
  establishing, by the in-cloud web portal, a second agentless connection to a second on-premises HCI appliance located at a different on-premises location; and performing, via the second agentless connection, a second configuration management operation to modify a configuration of the second on-premises HCI appliance.

7. A non-transitory computer readable medium, including process executable instructions that, when executed by a processor of an information handling system, cause the system to perform operations, wherein the operations include:
- establishing, by an in-cloud web portal including a customer browser, an agentless connection to an on-premises hyper-converged infrastructure (HCI) appliance wherein the agentless connection lacks a management agent intermediate between the in-cloud web portal and the on premises HCI appliance; and
- performing, via the agentless connection and a web application running in the customer, that communicates with managed clusters of the HCI appliance via a local or virtual private network (VPN) tunnel, a configuration management operation to modify a configuration of the HCI appliance, wherein the HCI appliance provides integrated and centrally management compute, storage, and network resources for a cluster of two or more nodes.

8. The non-transitory computer readable medium of claim 7, wherein establishing the agentless connection and performing the configuration management operation include performing one or more API calls to establish the agentless connection and perform the configuration management operation.

9. The non-transitory computer readable medium of claim 8, wherein the operations further include:
- establishing, by the in-cloud web portal, a second agentless connection to a second on-premises HCI appliance located at a different on-premises location; and
- performing, via the second agentless connection, a second configuration management operation to modify a configuration of the second on-premises-HCI appliance.

\* \* \* \* \*